June 16, 1964     E. M. PALMER     3,137,274
ANIMAL FEEDER AND INSECTICIDE DISPENSER
Filed June 10, 1963
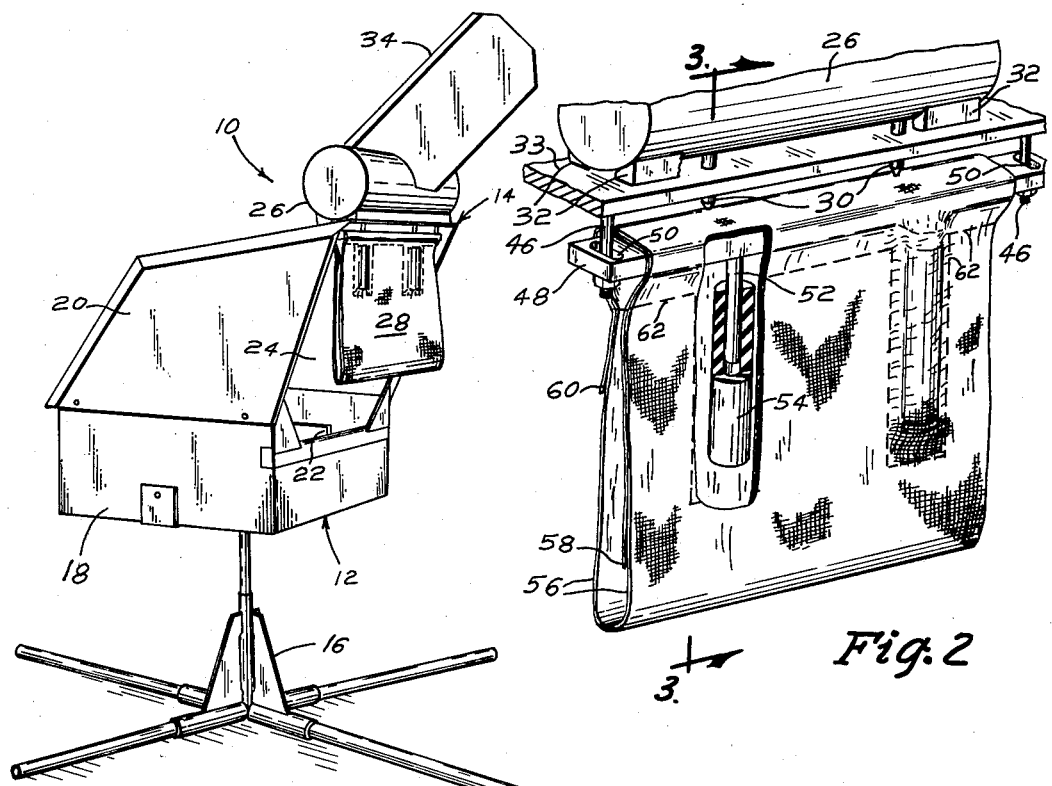
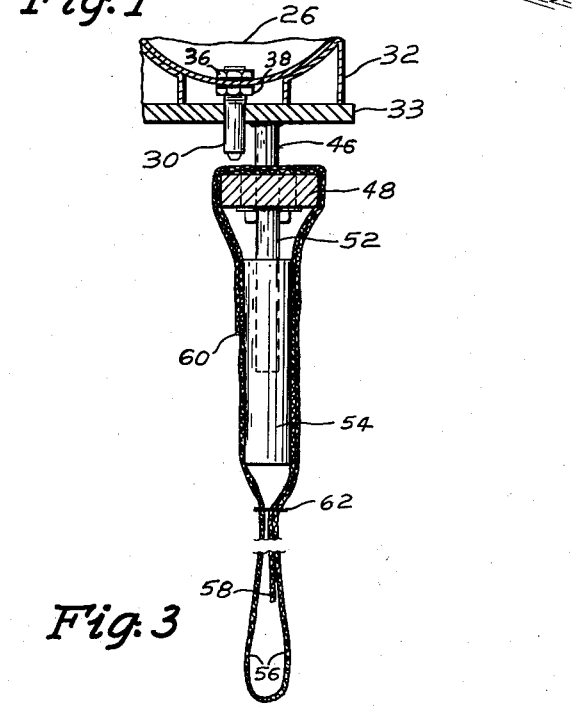
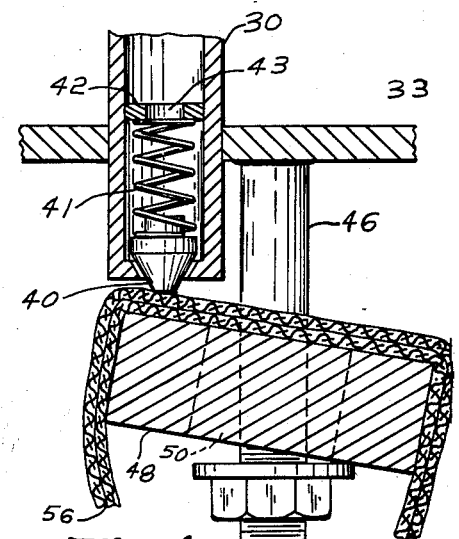
INVENTOR
EVERETT M. PALMER
BY
Dick, Zarley + Henderson
ATTORNEYS

United States Patent Office 3,137,274
Patented June 16, 1964

3,137,274
ANIMAL FEEDER AND INSECTICIDE
DISPENSER
Everett M. Palmer, Maynard, Iowa
Filed June 10, 1963, Ser. No. 286,705
10 Claims. (Cl. 119—157)

This invention relates to an animal feeder and insecticide dispenser assembly and more particularly to an animal face fly insecticide applicator.

Insects and particularly flies are attracted to the faces of animals. This problem has been especially acute with respect to cattle. The flies can cause severe irritation to the animal, pink eye blindness in one or both eyes and even the death of the animal. As with any other discomfort or irritation, the animal does not grow as rapidly or additionally in the care of milk cows, give the normal quantity of milk. Heretofore many attempts have been made to solve the insect problem in the cattle business, but none yet has proven completely satisfactory.

Therefore an object of this invention is to provide an insecticide applicator which is effective in treating animals for the control of face flies and other insects.

Another object of this invention is to provide an animal feeder and insecticide dispenser which will automatically treat each animal with insecticide that eats from the feeder.

Another object of this invention is to provide an insecticide dispenser structure having an applicator which is automatically filled with insecticide as each animal is being treated.

A further object of this invention is to provide an animal feeder and insecticide dispenser which is simple in design, economical to manufacture and refined in appearance.

These and other objects, and other features and advantages of this invention will become readily apparent upon reference to the following description when taken in conjunction with the accompanying drawings, wherein:

FIG. 1 is a perspective view of the animal feeder and insecticide dispenser assembly;

FIG. 2 is a fragmentary enlarged perspective view of only the insecticide dispenser and applicator structure;

FIG. 3 is a cross-sectional elevation view taken along line 3—3 of FIG. 1 of the insecticide dispenser and applicator structure; and FIG. 4 is an enlarged fragmentary sectional view of the outlet valve being actuated to an open position by the pivotal movement of the applicator device.

The animal feeder and insecticide dispenser of this invention is generally referred to in FIG. 1 by the reference numeral 10 and is shown to comprise a feeder housing or container 12 and an insecticide dispenser structure 14.

The feeder housing 12 is rotatably mounted at the top of a standard 16 and as shown in FIG. 1 the housing includes a feed or mineral box 18 covered by a hood 20. The feed box includes two compartments formed by the divider 22. The hood 20 completely encloses the feed box 18 on all sides except one which results in an opening 24 through which animals may feed.

The insecticide dispenser structure 14 basically includes an insecticide tank 26 positioned atop of the hood 20 and an insecticide applicator 28 or gate member which extends down from the top forward edge of the hood across the opening 24. A pair of valves 30 are provided in the bottom of the tank 26 for dispensing insecticide onto the applicator gate 28 (FIG. 3).

The tank 26 which extends transversely of the hood 20 is secured by elements 32 to the topside wall portion 33 of the hood 20. These securing elements are positioned on opposite sides at each end of the cylindrical tank 26. Atop of the tank 26 is mounted a wind vane 34 (FIG. 1) which will react to the wind by turning the open side of the feeder housing to a position where it is facing the same direction as the wind is blowing thereby preventing rain, snow and dirt from entering the feeder box.

The valves 30 on the bottom side of the tank 26 are held by locking elements 36 and 38 on the opposite side of the bottom tank wall. In the lower end of each of the valves is a trigger element 40 held normally closed by a helical spring 41 which bears against a disc element 42 which has a center opening 43 (FIG. 4).

The applicator or gate member 28 is pivotally held in position across the opening 24 in the hood by a pair of rod elements 46 at opposite sides of the top hood side wall portion 33. These rods extend downwardly from the hood portion 33 and are pivotally connected to an elongated bar 48 which extends transversely along the top end of the applicator 28. To receive the ends of the rods 46, elongated transverse openings 50 are formed in the bar 48 at each of its ends.

Extending downwardly from the central area of the bar 48 are parallel pin elements 52 each having a piece of flexible tubing 54 telescoped over its free end. The tubing may be of rubber, plastic or the like material. The pins 52 and tubing 54 give added strength to the applicator gate 28 which is covered by a length of canvas material 56 formed into an endless belt. The canvas material alone is not rigid enough to pivot the bar 48 as required for the reason to be subsequently described. One end 58 of the canvas material is looped over the bar 48 and the canvas is extended down the rear side of the bar and back up past the one end 58 and over the bar 48 again where it terminates in an end portion 60 midway down the rear side. A plurality of staples 62 are applied to the adjacent canvas portions directly below the bar 48, along the peripheral edges of the strengthening pins 52 and tubes 54, and transversely across the length of canvas under the free ends of the tubing 54.

In operation it is thus seen that when the animal puts its head through the opening 24 into the feeder box 18 the applicator gate 28 will be contacted and pivoted inwardly of the housing 12. As the gate 28 pivots the bar 48 pivots on the rods 46 such that the rear top side of the bar is moved upwardly into operative contact with the trigger elements 40 in the valves 30 thereby permitting insecticide to be dispensed from the tank 26 onto the canvas 56 of the gate 28. The canvas 56 is absorbent and will hold sufficient insecticde to give an adequate application to the face of the next animal that eats at the feeder box 18. Typically, the feeder box 18 will be supplied with dry feed, minerals or any other edible substance. The insecticide may be either gravity fed through the valves 30 onto the canvas 56 as shown in the drawings or dispensed under air pressure or by a conventional pump assembly (not shown).

The simplicity and effectiveness of the animal feeder and insecticide dispenser is believed apparent but it is emphasized that the insecticide tank 26 is located in a position atop of the hood 20 which is out of the reach of the animals and also permits the gravity dispensing of the insecticide. Additionally, the insecticide is not sprayed onto the animals which would tend to frighten them but rather is rubbed on without their realization or if they do appreciate the fact that they are receiving an insecticide treatment they will not be disturbed because it is completely painless and probably very soothing.

Some changes may be made in the construction and arrangement of my animal feeder and insecticide dispenser without departing from the real spirit and purpose of my invention, and it is my intention to cover by my claims, any modified forms of structure or use of mechanical equivalents which may be reasonably included within their scope.

I claim:

1. A liquid insect repellent dispensing apparatus comprising, in combination,
- a feed storage housing adapted to hold animal feed having one side wall open for animals to feed through;
- a gate member pivotally connected to said housing and partially closing said one open side, said gate member including liquid absorbent material, said gate member adapted to be pivoted by an animal engaging it upon putting its head through said open side;
- a container mounted on said housing and adapted to hold insect repellent; and
- valve means positioned on said container in the movable path of said gate member and periodically engaging said gate member when said gate member is pivoted towards an open position, said valve means adapted to open upon engagement with said gate member and emit liquid in said container onto said absorbent material.

2. A liquid insect repellent dispensing apparatus comprising, in combination,
- a feed storage housing adapted to hold animal feed having one side wall open for animals to feed through;
- a gate member pivotally connected to said housing along the top of said open side wall and partially closing said opening, said gate member including liquid absorbent material, and said gate member adapted to be pivoted by an animal engaging it upon putting its head through said open side wall;
- a container mounted on said housing and adapted to hold insect repellent; and
- valve means positioned on said container in the movable path of said gate member and periodically engaging said gate member when said gate member is pivoted towards an open position, said valve means adapted to open upon engagement with said gate member and emit liquid in said container onto said absorbent material.

3. A liquid insect repellent dispensing apparatus comprising, in combination,
- a feed storage housing adapted to hold animal feed having one side wall open for animals to feed through;
- a gate member pivotally connected to said housing and partially closing said one open side, said gate member including liquid absorbent rubbing applicator material, said gate member adapted to be pivoted by an animal engaging it upon putting its head through said open side;
- a container mounted on said housing and adapted to hold insect repellent;
- valve means carried on said container and having an outlet opening directed towards said gate member; and
- trigger means positioned in operative contact with said gate member and said valve means, said trigger means adapted to open said valve means upon said gate member being pivoted thereby permitting liquid insect repellent to be emitted onto said absorbent material.

4. A liquid insect repellent dispensing apparatus comprising, in combination,
- a feed storage housing adapted to hold animal feed having one side wall open for animals to feed through;
- an elongated gate member pivotally connected to said housing and when in its normal position partially closing said one open side of said housing, said gate member comprising a transverse member at one end for pivoting said gate member to said housing, and a length of liquid absorbent canvas material of an endless construction secured at one end to said transverse member, means secured to said transverse member and said length of canvas material for increasing the rigidity of said canvas such that when an animal bears against it said transverse member will be pivoted;
- a container mounted on said housing and adapted to hold insect repellent;
- valve means carried on said container and having an outlet opening directed towards said gate member; and
- trigger means in periodic operative contact with said gate member and said valve means, said trigger means adapted to open said valve means upon said gate member being pivoted thereby permitting liquid insect repellent to be emitted onto said absorbent material.

5. A liquid insect repellent dispensing apparatus comprising, in combination,
- a feed storage housing adapted to hold animal feed having one side wall open for animals to feed through;
- a gate member pivotally connected to said housing and extending across said open side wall, said gate member comprising an elongated bar member extending across the top of said opening and being pivotally connected to said housing for pivoting said gate member, a length of canvas material secured at one end to said elongated bar and extending downwardly of the opening in said one side wall; and
- a container adapted to hold liquid insect repellent, at least one valve operatively connected to said container to emit said insect repellent, said valve being positioned above and on the inner side of the longitudinal axis of said elongated bar, a trigger means in said valve adapted to engage the inner side of said elongated bar upon said gate member being pivoted inwardly of said housing and thereby causing said valve to emit said liquid insect repellent onto the length of canvas material.

6. The structure of claim 5 wherein said container is mounted on top of said housing and said valve extends downwardly therefrom.

7. The structure of claim 5 wherein said container is mounted on top of said housing and said valve extends downwardly therefrom, and said bar has a pair of transverse slots formed through its opposite ends, pivotal support bolt means extending through each of said slots and secured to said housing.

8. A liquid insect repellent dispensing apparatus comprising, in combination,
- a feed storage housing adapted to hold animal feed having one side wall open for animals to feed through;
- a gate member pivotally connected to said housing and extending across said open side wall, said gate member comprising an elongated bar member extending across the top of said opening and being pivotally connected to said housing for pivoting said gate member, at least one rod member secured to and extending downwardly of said bar, a length of canvas material secured at one end to said elongated bar and said rod member, and said canvas normally extending across the opening in said one side wall; and
- a container adapted to hold liquid insect repellent, at least one valve operatively connected to said container to emit said insect repellent, said valve being positioned above and on the inner side of the longitudinal axis of said elongated bar, a trigger means in said valve periodically engaging the inner side of said elongated bar upon said gate member being pivoted inwardly of said housing and thereby causing said valve to emit said liquid insect repellent onto the length of canvas material.

9. The structure of claim 8 and an elongated resilient tubing element having one end telescoped over the free end of said rod, and said tubing extending downwardly of and being secured to said canvas material.

10. A liquid insect repellent dispensing apparatus comprising, in combination, a feed storage housing adapted to hold animal feed having one side wall open for animals to feed through;

a gate member pivotally connected to said housing and extending across said open side wall, said gate member comprising an elongated bar member extending across the top of said opening and being pivotally connected to said housing for pivoting said gate member, at least one rod member secured to and extending downwardly of said bar, an elongated resilient tubing element having one end telescoped over the free end of said rod and said tubing extending downwardly of said rod, and a length of absorbent material formed into an endless belt having one end embracing and being secured to said elongated bar, said belt extending downwardly of said bar across said open side wall and said rod member and tube element being disposed between the opposite sides of said belt and being secured thereto; and a container adapted to hold liquid insect repellent, at least one valve operatively connected to said container to emit said insect repellent, said valve being positioned above and on the inner side of the longitudinal axis of said elongated bar, a trigger means in said valve periodically engaging the inner side of said elongated bar upon said gate member being pivoted inwardly of said housing and thereby causing said valve to emit said liquid insect repellent onto the length of absorbent material.

References Cited in the file of this patent
UNITED STATES PATENTS

| | | |
|---|---|---|
| 2,273,616 | Beatty | Feb. 17, 1942 |
| 2,777,421 | Hiebert | Jan. 15, 1957 |
| 2,945,474 | McIntyre | July 19, 1960 |
| 2,965,070 | Myrick | Dec. 20, 1960 |
| 3,007,443 | Ryan | Nov. 7, 1961 |
| 3,071,111 | Hamilton | Jan. 1, 1963 |
| 3,079,893 | Francisco | Mar. 5, 1963 |
| 3,086,499 | Dilley | April 23, 1963 |